L. MOODY.
SPADING MACHINE.
No. 85,019.
Patented Dec. 15, 1868.
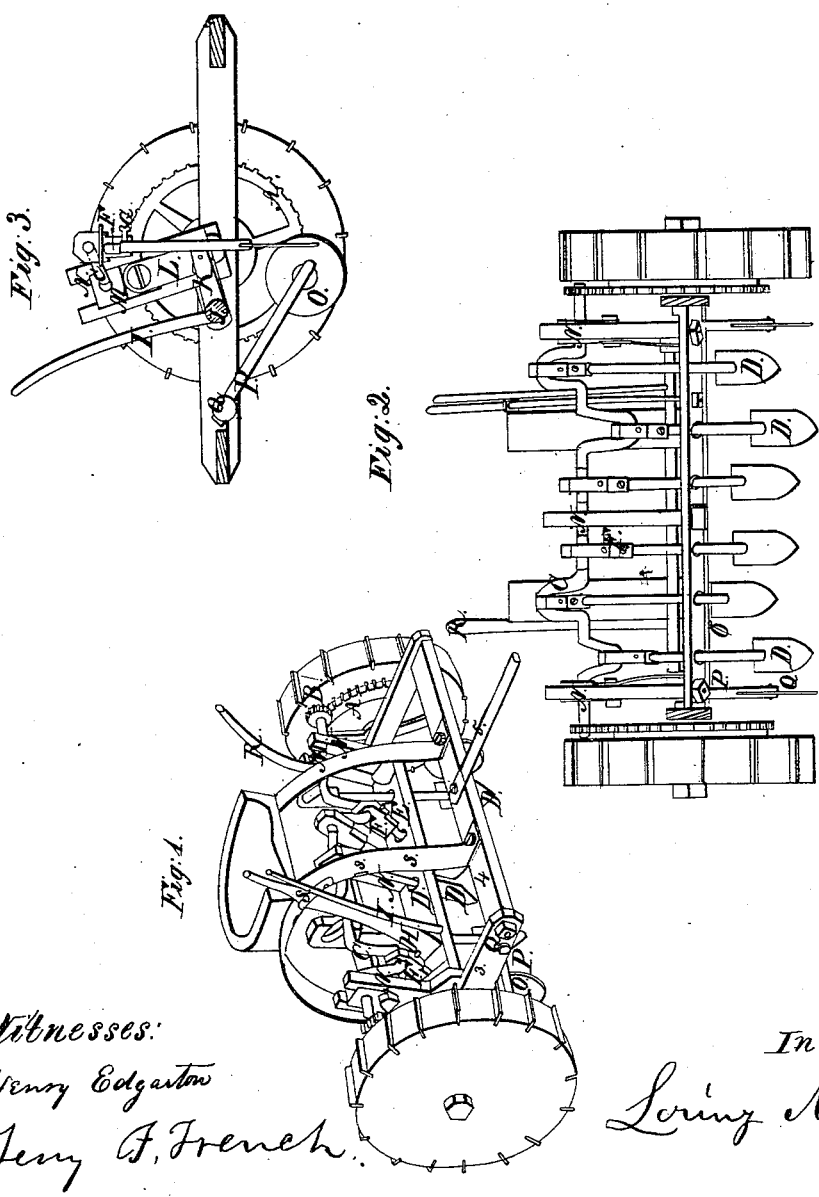

LORING MOODY, OF MALDEN, MASSACHUSETTS.

Letters Patent No. 85,019, dated December 15, 1868.

IMPROVEMENT IN SPADING-MACHINE.

The Schedule referred to in these Letters Patent and making part of the same.

Be it known that I, LORING MOODY, of Malden, in the county of Middlesex, and Commonwealth of Massachusetts, have invented a new and useful Improvement in Spading-Machines; and I do hereby declare that the following is a full, clear, and exact description of the construction and operation of the same, reference being had to the annexed drawings, making a part of this specification, in which—

Figure I is a view of the machine in perspective;
Figure II, a rear elevation; and
Figure III, a section.

In the drawings, A denotes a gearing on the traction-wheel, which may be made as a part of the wheel, or separately, and attached to it.

This gear is made to interlock with the pinion B on the end of the crank-shafts C, so that, by its revolutions, it shall operate the spades D.

These spades are connected to the cranks by means of the sockets F, which are of sufficient depth to allow of the spades being drawn up or extended at pleasure, and held in their places by means of the screws G.

The inclining lever H is fastened to the axle E in such a manner as to be made, by its own elasticity, to press laterally against the support of the driver's seat, 1, where it may be held at any needed angle of inclination by the notches 5.

This lever being fixed to the axle, inclines along with it the axle, posts, cranks, and spades, as well as the disconnecting-lever and its attachments, so as to allow the spades to enter the earth at any desired angle or depth, or to be thrown out of it altogether.

The axle and all the parts fixed to it are arranged so as to turn in the side-frames upon the same centre as the gear-wheels.

Near the inclining lever H is the disconnecting-lever I, which is so secured to the rotating bar J as to cause it to press against the lever H, connected with which is the notched arm S.

Projecting backward from the rotating bar J, which is held in place by its ends passing through projections from the posts N, are the arms K, which may be raised or lowered by the backward or forward movement of the disconnecting-lever I.

These arms are connected with the sliding blocks M by means of the rods L, and, as the crank-shafts are held in place by passing through these blocks M, they may be elevated or depressed by means of the lever I, and the pinion on these ends thrown out of or into gear, at pleasure, the lever I being held securely in position by the notches in the arm S.

To the left of the driver's seat is the lever R, which is firmly secured to the rotating bar Q, which is held in place by passing its ends through holes in the side-frames. (See fig. 3.)

Extending backward from the rotating bar Q are the arms P, to the ends of which are attached the rotary coulters O.

The connection between the levers and the coulters is such that, by drawing the lever backward, the coulters will be pressed into the earth, and cut the soil as the machine moves onward.

What I claim as my invention, and desire to secure by Letters Patent, is—

1. Hanging, upon cranks, spades, with handles passing through the axle, which serves as their fulcram, operating substantially as and for the purposes described.

2. Connecting the spade-handles with the crank by means of the sockets and screws, in order to lengthen or shorten them, at pleasure, substantially as and for the purposes described.

3. The combination of the lever H with the axle, whereby the spades may be inclined at any angle with the earth, or thrown out of it, when desired, substantially as and for the purposes described.

4. The combination of the lever I, the rotating bar J, and the arm K, with the crank C, for throwing the machine out of or into gear, at pleasure, substantially as and for the purposes described.

5. The combination of the movable blocks M with the cranks C and the posts N, substantially as and for the purposes described

LORING MOODY.

Witnesses:
HENRY EDGERTON,
HENRY F. FRENCH.